A. A. VITT.
Elevator Cups.

No. 118,076. Patented August 15, 1871.

Witnesses:
Ph. C. Dieterich
Francis McArdle

Inventor:
A. A. Vitt
Per Munn & Co.
Attorneys.

UNITED STATES PATENT OFFICE.

ALFRED A. VITT, OF UNION, MISSOURI.

IMPROVEMENT IN ELEVATOR-CUPS.

Specification forming part of Letters Patent No. 118,076, dated August 15, 1871.

*To all whom it may concern:*

Be it known that I, ALFRED A. VITT, of Union, in the county of Franklin and State of Missouri, have invented a new and useful Improvement in Elevator-Cups; and I do hereby declare that the following is a full, clear, and exact description thereof, which will enable others skilled in the art to make and use the same, reference being had to the accompanying drawing forming part of this specification, in which—

Figure 1:
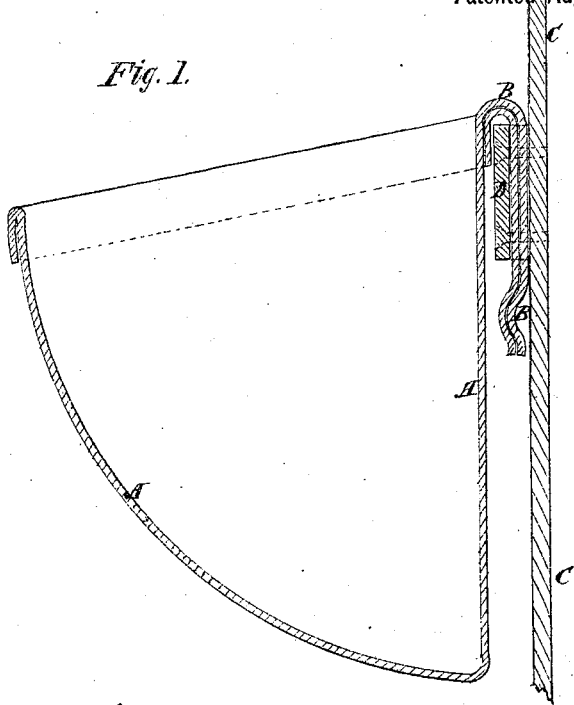
Figure 2:
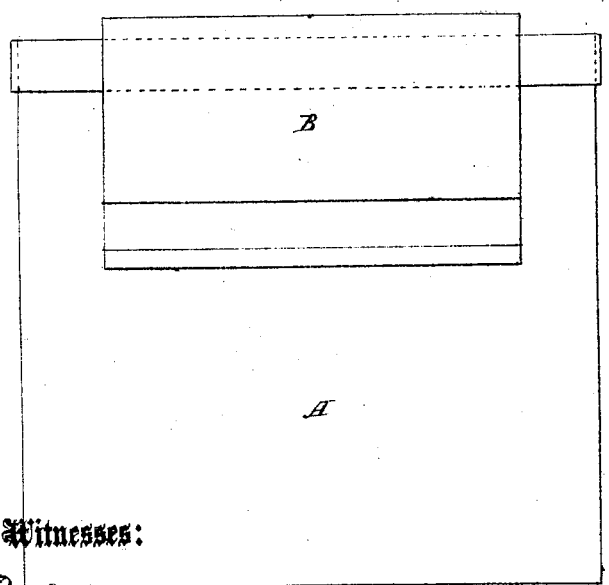

Figure 1 is a detail sectional view of my improved elevator-cup, shown as attached to the belt. Fig. 2 is a rear view of the cup detached from the belt.

Similar letters of reference indicate corresponding parts.

My invention has for its object to furnish an improved elevator-cup which shall be so constructed and attached to the belt that its rear side may have a smooth inner surface, and that it may be conveniently and quickly attached to and detached from the belt when desired without disturbing the said belt; and it consists of the hook-shaped extension of the back of the cup to adapt it for detachable attachment to the belt, as hereinafter more fully described.

A is the elevator-cup, the body of which is constructed in the ordinary form and manner. The rear side of the cup A has an extension, B, formed upon it, which extension is made double to give it the requisite strength, and is bent into hook-form, as shown in Figs. 1 and 2. C represents the elevator-belt, to which, at suitable distances apart, are attached cross-straps D, the ends of which are secured to the belt C, near its edges, by rivets, leaving the middle part of said cross-strap D free to receive the hook-shaped extension B of the back of the cup A, as shown in Fig. 1. The extension B, near its end, is bent or corrugated transversely, as shown in Figs. 1 and 2, to prevent the cups from dropping out when descending.

By this construction the inner surface of the rear side of the cups is left free, and presents no rivets or nuts for the flour, meal, or grain to catch upon and lodge. By this construction, also, should any of the cups be accidentally broken they can be easily and quickly detached and replaced with new ones.

Having thus described my invention, I claim as new and desire to secure by Letters Patent—

The hook-shaped extension B of the rear side of an elevator-cup A, to adapt it for attachment to an elevator-belt, C, by means of a cross-strap, D, substantially as herein shown and described, and for the purposes set forth.

ALFRED A. VITT.

Witnesses:
J. C. KISKADDON,
WILLIAM DRESS.